(12) United States Patent
Segal et al.

(10) Patent No.: US 12,717,611 B1
(45) Date of Patent: Aug. 25, 2026

(54) TRAFFIC CONTROLLER CIRCUIT

(71) Applicant: Amazon Technologies, Inc., Seattle, WA (US)

(72) Inventors: Avigdor Segal, Netanya (IL); Jonathan Cohen, Hod Hasharon (IL); Barak Singer, Saratoga, CA (US); Alon Hochman, Tel Aviv (IL); Anna Rom-Saksonov, Rosh Haayin (IL); Tomer Malach, Ramat Gan (IL)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 18/958,353

(22) Filed: Nov. 25, 2024

(51) Int. Cl.
*G06F 9/48* (2006.01)

(52) U.S. Cl.
CPC .......... *G06F 9/4825* (2013.01); *G06F 9/4843* (2013.01)

(58) Field of Classification Search
CPC ............................ G06F 9/4825; G06F 9/4843
See application file for complete search history.

(56) References Cited

U.S. PATENT DOCUMENTS

| | | | | |
|---|---|---|---|---|
| 4,365,311 A * | 12/1982 | Fukunaga | G06F 9/3869 712/E9.063 |
| 6,983,389 B1 * | 1/2006 | Filippo | G06F 1/3215 713/324 |
| 7,233,948 B1 * | 6/2007 | Shamoon | H04N 21/8352 707/999.102 |
| 7,958,483 B1 * | 6/2011 | Alben | G06F 1/3203 716/132 |
| 2019/0132387 A1 * | 5/2019 | Singh | H04L 67/12 |
| 2022/0067876 A1 * | 3/2022 | Kondguli | G06F 12/0877 |
| 2023/0185745 A1 * | 6/2023 | Wu | G06F 13/28 710/22 |

* cited by examiner

*Primary Examiner* — Zahid Choudhury
(74) *Attorney, Agent, or Firm* — Weaver Austin Villeneuve & Sampson LLP

(57) ABSTRACT

A traffic controller (TC) circuit monitors an ingress stream being fed to an integrated circuit (IC) component comprising the TC circuit, wherein the IC component is part of a processing pipeline of a computing device. The TC circuit controls input traffic on the ingress stream to processing logic circuitry of the IC component. The TC circuit also controls output traffic on an egress stream being outputted from the IC component. The TC circuit generates an interrupt based on a set of operational metric configurations, and the ingress stream or the egress stream.

21 Claims, 5 Drawing Sheets

TRAFFIC CONTROLLER CIRCUIT

BACKGROUND

Some computing devices may include a plurality of integrated circuit (IC) pipeline stages for processing transactions. A communication device may be an example of a computing device that is generally used to facilitate data transfer among different devices on a network by transmitting or receiving packets for different applications. In some cases, a hardware error or a bug in one of the IC pipeline stages may cause the processing pipeline to get stuck, which can impact the system performance, and provide poor user experience.

BRIEF DESCRIPTION OF THE DRAWINGS

Various embodiments in accordance with the present disclosure will be described with reference to the drawings, in which.

DETAILED DESCRIPTION

Figure 1:
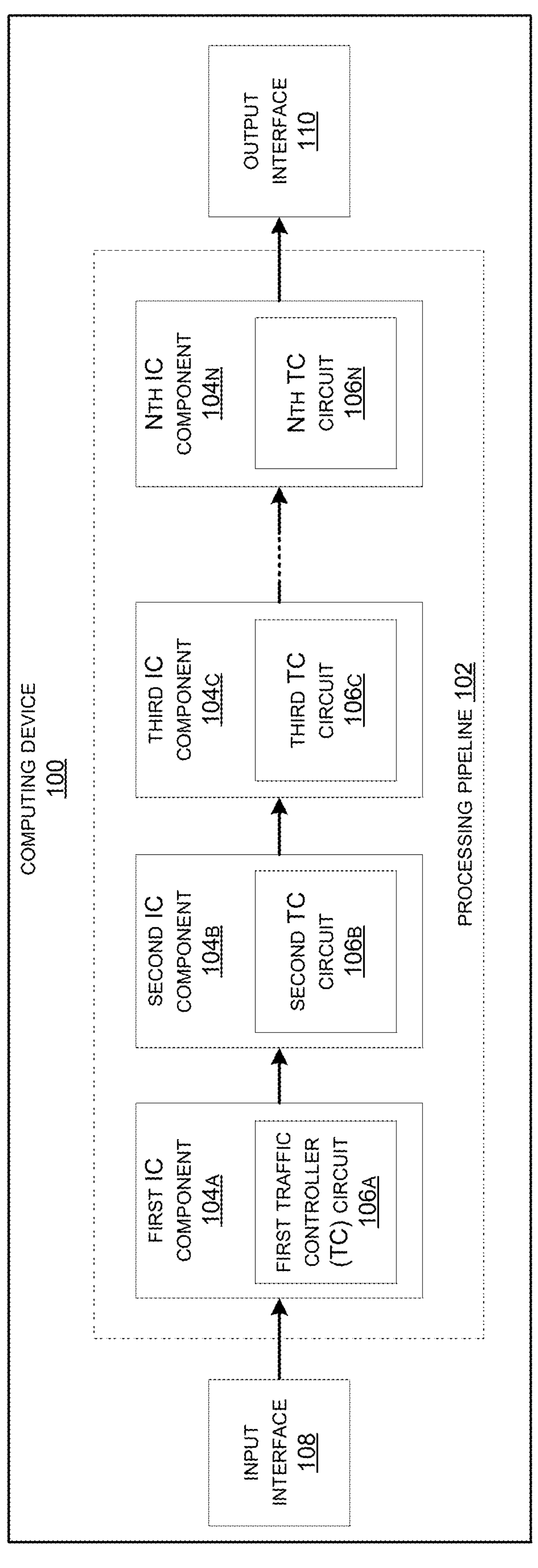
FIG. 1 illustrates an example of a computing device comprising a processing pipeline of a plurality of IC components operable to process a stream of packets.

Some computing devices may include a processing pipeline of integrated circuit (IC) components to process transactions for various applications. A communication device is an example of a computing device that may generally include one or more processors, memory, interconnects, direct memory access (DMA) engines, etc., to facilitate data transfer between different devices on a network using any transaction type (e.g., packets). An example communication device may include a network adapter device (e.g., an Ethernet controller) which may be used to transfer packets between a source device and a destination device over the network. The network adapter devices may be used in a server computer to transfer network packets for various applications, such as, artificial intelligence, high performance computing, web hosting, gaming, video processing, among others.

In some implementations, the communication device may include a transmission (TX) path and a reception (RX) path for transmitting and receiving packets, respectively, via the network. Each of the TX path and the RX path may include a corresponding processing pipeline, which may comprise a plurality of integrated circuit (IC) pipeline stages based on the functionality supported by each IC pipeline stage. For example, the plurality of IC pipeline stages may be operable to perform metadata extraction, preprocessing, encryption/decryption, compression/decompression, CRC/checksum calculations or validations, data placement, etc. The communication device may be implemented using a system-on-a-chip (SoC), or other suitable IC devices.

In some cases, an error, or a bug in the software or the hardware of one of the IC pipeline stages can cause the processing pipeline to get stuck, which may impact transmission or reception of the packets, and degrade system performance. As the size of the devices increases, detecting the location of the problem, as well as the type of the problem, can get more challenging. In some cases, manual intervention may be required to identify the problem area before the problem can be resolved.

Techniques described herein provide a traffic controller (TC) circuit that can be integrated in each IC pipeline stage of the processing pipeline to monitor movement of the packets between the IC pipeline stages, control the input and output traffic of the IC pipeline stage, and generate an interrupt when an operational metric is not satisfied for the IC pipeline stage. The TC circuit may be operable to monitor an ingress stream being fed to the IC pipeline stage for processing by the processing logic circuitry of the IC pipeline stage, and an egress stream being outputted from the IC pipeline stage. The TC circuit may be operable to control the input traffic on the ingress stream, and output traffic on the egress stream based on a traffic control configuration. Statistics can be collected using a set of counters and timers. The TC circuit may determine whether the operational metric is satisfied based on a set of configurations, and the ingress stream or the egress stream. The set of configurations may include respective thresholds and masks for the set of counters and timers based on the function supported by the processing logic circuitry, and parameters for controlling the traffic.

The TC circuit may be operable to control the input traffic by controlling the rate/shape of the ingress stream, or blocking/unblocking the ingress stream to the processing logic circuitry. The TC circuit may also be operable to create backpressure to a preceding pipeline stage when the processing logic circuitry is unable to receive new packets, e.g., due to the pipeline stage being stuck. The TC circuit may use counters to track the number of packets inside the IC pipeline stage and being outputted from the IC pipeline stage, and select between blocking the ingress stream and passing the ingress stream to the processing logic circuitry accordingly. The TC circuit may unblock the ingress stream to the processing logic circuitry when the processing logic circuitry is ready to receive new packets. The TC circuit may also be operable to control the output traffic by controlling the rate/shape of the egress stream, blocking/unblocking the egress stream, or sending bursts of consecutive data packets in the egress stream. The set of counters and timers can be used to collect statistics for debugging purposes, which can help identify and resolve problems in the processing pipeline and minimize impact on the system performance.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computing device 100 comprising a processing pipeline 102 of a plurality of IC components operable to process a stream of packets. For example, the computing device 100 may be a network adapter device (e.g., an Ethernet controller) operable to transmit or receive network packets via a network. As an example, the computing device 100 may include functionality to support media access control (MAC) interface, physical coding sublayer (PCS) interface, physical (PHY) interface, and other suitable components to enable the transmission or reception of network packets via the network. In some examples, the computing device 100 may be part of a server computer, and the computing device 100 may be used to transmit or receive packets via the network for an application executing on the server computer. Note that some embodiments are described using a network adapter device that transmits or receives packets, but the techniques described herein can be applied to any computing device having pipeline stages of IC components for processing any type of packets (e.g., frames, transactions, messages, etc.).

An example of the computing device 100 may include separate processing pipelines for a transmission (TX) path and a reception (RX) path. For example, a TX processing pipeline may be operable to process network packets for transmitting over a network, and an RX processing pipeline may be operable to process network packets received over the network. The processing pipeline 102 described with reference to FIG. 1 can be an example of the TX processing pipeline or the RX processing pipeline. Note that the computing device 100 may include additional components (e.g., a processor, TX buffer, RX buffer, DMA engine, interconnects, physical ports, etc.) to support the intended functionality of the network adapter, which are not described with reference to FIG. 1. In some implementations, components of the computing device 100 may be connected using one or more interconnects based on any suitable bus protocol, e.g., Advanced extensible Interface (AXI), Advanced Peripheral Bus (APB), etc. The computing device 100 may be implemented using a system-on-a-chip (SoC) or other suitable ICs.

In some implementations, the processing pipeline 102 may be partitioned into a plurality of IC components based on the functionality supported by each IC component, and/or to simplify the physical design process of the computing device 100. Each IC component may form a processing pipeline stage of the computing device 100. As shown in FIG. 1, the example processing pipeline 102 may include N number of IC components including a first IC component 104*a*, a second IC component 104*b*, a third IC component 104*c*, and an $N^{th}$ IC component 104*n*. Each IC component may include a corresponding processing logic circuitry (not shown in FIG. 1) to perform a different function or aspect of packet processing based on the functionality of the computing device 100. Each of the N IC components may be operable to receive an ingress stream of packets for processing from a preceding IC pipeline stage, and provide an egress stream of packets to a subsequent IC pipeline stage after processing the packets based on the function. In some implementations, a ready/valid protocol may be implemented to transfer the packets between the source and destination IC pipeline stages in the processing pipeline 102. For example, the ready signal may be asserted by an IC component to indicate that the IC component is ready to accept the packets from the preceding IC component on the ingress stream, and the valid signal may be asserted to indicate that the packets on the egress stream to the subsequent IC component are carrying valid data.

The processing pipeline 102 may communicate with other components of the computing device 100 using an input interface 108 at the input of the pipeline, and using an output interface 110 at the output of the pipeline. For the TX path, the input interface 108 may be operable to receive packets that need to be processed by the processing pipeline 102 for transmitting over the network via the output interface 110. For example, the output interface 110 may utilize a DMA engine to transfer the packets that may be stored in a TX buffer using appropriate DMA descriptors as configured by a software interface. For the RX path, the input interface 108 may be operable to receive packets via the network that need to be processed by the processing pipeline 102 for sending to other components of the computing device 100 via the output interface 110. For example, the packets received from the network may be stored in an RX buffer, and can be transferred to the other components of the computing device 100 using the DMA engine as configured by the software interface.

As an example, for the TX path, the first IC component 104*a* may receive an ingress stream of packets for an application executing on the server computer. The first IC component 104*a* may be operable to process the packets (e.g., extract metadata or compute offsets) and send the processed packets on an egress stream to the second IC component 104*b*. The second IC component 104*b* may be operable to receive the packets from the first IC component 104*a* on an ingress stream, process the packets (e.g., perform compression and/or encryption), and send the processed packets on an egress stream to the third IC component 104*c*. The third IC component 104*c* may be operable to receive the packets from the second IC component 104*b* on an ingress stream, process the packets (e.g., perform CRC/checksum calculations), and send the processed packets on an egress stream to a neighboring IC component in the processing pipeline 102. The $N^{th}$ IC component 104*n* may be operable to receive an ingress stream of packets from a preceding IC component, process the packets (e.g., insert PHY connectivity), and send the processed packets to the output interface 110 for transmitting over the network.

For the RX path, the first IC component 104*a* may receive the ingress stream of packets from the network using the input interface 108, process the packets (e.g., extract metadata) and send the processed packets on an egress stream to the second IC component 104*b*. The second IC component 104*b* may be operable to receive the packets from the first IC component 104*a* on an ingress stream, process the packets (e.g., perform decryption and/or decompression), and send the processed packets on an egress stream to the third IC component 104*c*. The third IC component 104*c* may be operable to receive the packets from the second IC component 104*b* on an ingress stream, process the packets (e.g., perform CRC/checksum validation), and send the processed packets on an egress stream to a neighboring IC component in the processing pipeline 102. The $N^{th}$ IC component 104*n* may be operable to receive an ingress stream of packets from a preceding IC component, process the packets (e.g., data placement), and send the processed packets on an egress stream to the output interface 110 for transferring to other components of the computing device 100. For example, the output interface 110 may use the DMA engine to transfer the packets stored in the RX buffer to a memory in the server computer accessible by the application, e.g., using appropriate DMA descriptors configured by the software interface.

In some embodiments, each of the N IC components 104*a*-104*n* may include a respective traffic controller (TC) circuit comprising TC logic circuitry to monitor traffic or movement of packets through the IC component by monitoring the ingress stream being fed to the corresponding IC component and an egress stream being outputted from the IC component, and generate a corresponding interrupt based on the ingress stream and/or the egress stream, and a set of operational metric configurations. As shown in FIG. 1, the first IC component 104*a* may include a first TC circuit 106*a*, the second IC component 104*b* may include a second TC circuit 106*b*, the third IC component 104*c* may include a third TC circuit 106*c*, and the $N^{th}$ IC component 104*n* may include an $N^{th}$ TC circuit 106*n*. In various embodiments, some pipeline stages may include zero, one, or more TC circuits based on the functionality implemented by the pipeline stages.

Each TC circuit may include a corresponding set of timers and counters, which can be used to generate one or more interrupts based on the respective thresholds and masks for the counters and the timers provided by the set of operational metric configurations. Each TC circuit may be operable to control the input traffic by changing rate or shape of the input traffic on the ingress stream, blocking the ingress stream, or unblocking the ingress stream to the processing logic circuitry of the corresponding IC component for processing. For example, the TC circuit may block the ingress stream to the processing logic circuitry to generate back pressure to the preceding pipeline stage. Each TC circuit may also be operable to control the output traffic by changing the rate or shape of the egress stream, blocking or unblocking the egress stream, or sending bursts of data packets in the egress stream. This is further described with reference to FIG. 2.

Figure 2:
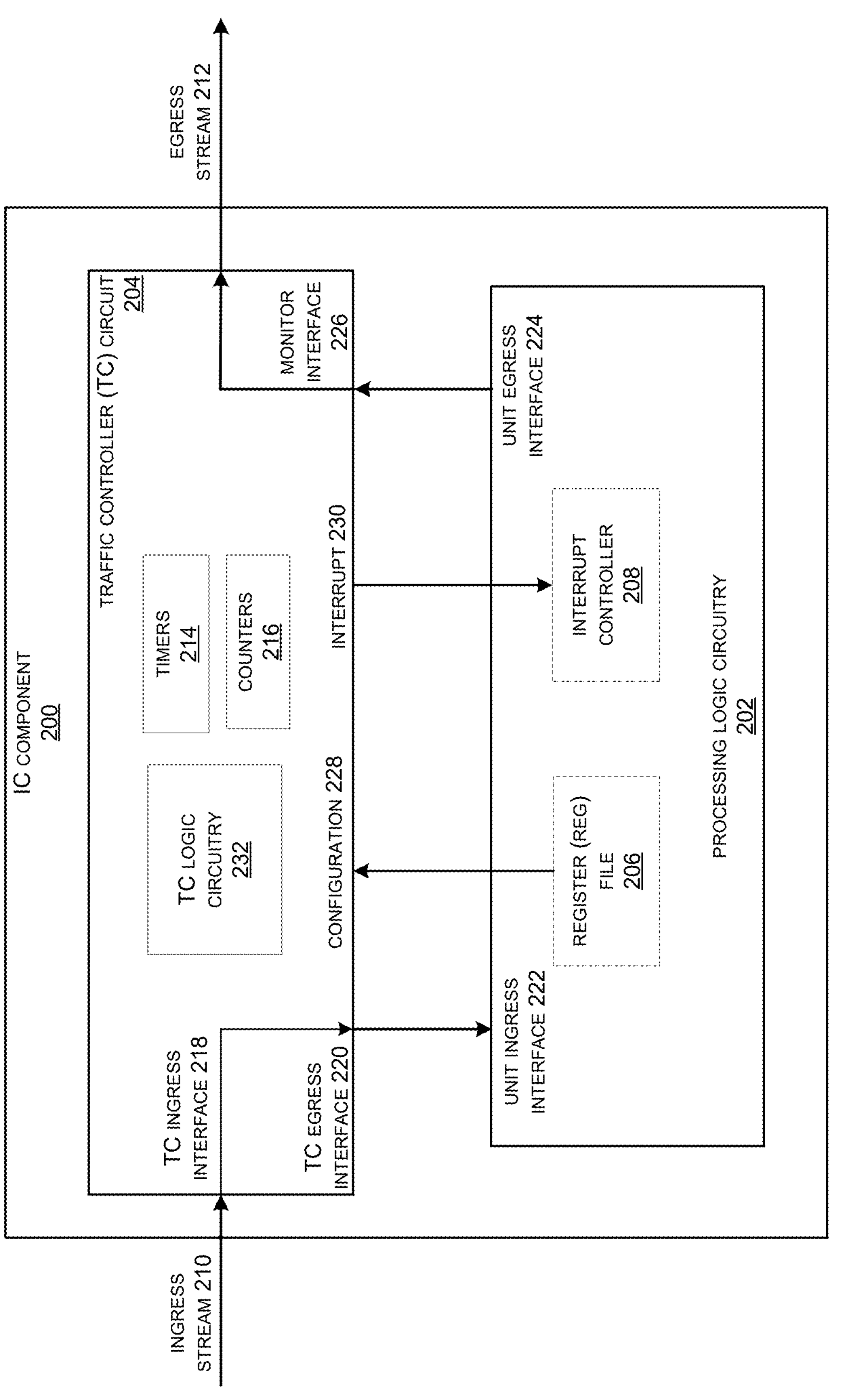
FIG. 2 illustrates an example of an IC component comprising a traffic controller (TC) circuit to control traffic on an ingress and egress streams of the IC component, in accordance with some embodiments.

FIG. 2 illustrates an example of an IC component 200 comprising a TC circuit 204 to control traffic on an ingress and egress streams of the IC component 200, in accordance with some embodiments. The IC component 200 can be an example of the IC component 104*a*-104*n*, and the TC circuit 204 can be an example of the corresponding TC circuit 106*a*-106*n*, described with reference to FIG. 1. For example, the processing logic circuitry 202 may be operable to perform encryption on the ingress packets for transmitting over the network.

The TC circuit 204 may include a TC logic circuitry 232, and a set of timers 214 and a set of counters 216. The TC logic circuitry 232 may be operable to monitor an ingress stream 210 being fed to the IC component 200 for processing by the processing logic circuitry 202, and an egress stream 212 being outputted from the IC component 200 by the processing logic circuitry 202. As shown in FIG. 2, the TC unit 204 may include an TC ingress interface 218 to receive the ingress stream 210, and an TC egress interface 220 to output the ingress stream 210 to the processing logic circuitry 202 for processing. The TC circuit 204 may also include a monitor interface 226 to monitor the egress stream 212. The TC circuit 204 may be operable to control the input traffic on the ingress stream 210 to the processing logic circuitry 202 and the output traffic on the egress stream 212 based on the set of operational metric configurations. The set of timers 214 and the set of counters 216 can be used to generate an interrupt based on whether the operational metric of the processing logic circuitry 202 is satisfied. The operational metric can be configured based on the corresponding thresholds and masks of the counters and timers. For example, the thresholds and masks corresponding to the counters 216 and the timers 214 can be accessed using a configuration interface 228.

The processing logic circuitry 202 may be operable to receive the ingress stream 210 being fed to the IC component 200 via the TC circuit 204 using a unit ingress interface 222. The processing logic circuitry 202 may be operable to process the ingress stream 210 received via the TC circuit 204 and output the processed stream using a unit egress interface 224. The TC circuit 204 may receive the processed stream via the monitor interface 226 and provide the egress stream 212 to be outputted from the IC component 200. The TC circuit 204 may be operable to control the traffic on the egress stream 212 based on the set of operational metric configurations. The processing logic circuitry 202 may also include a register (reg) file 206 to store the set of operational metric configurations comprising corresponding thresholds and masks for each of the timers 214 and the counters 216 of the TC circuit 204. The processing logic circuitry 202 may also include an interrupt controller 208 operable to notify a processor of the computing device 100 upon receiving an interrupt 230 from the TC circuit 204. Note that the reg file 206 and the interrupt controller 208 can be internal to the processing logic circuitry 202, or external to the processing logic circuitry 202.

The set of operational metric configurations may also include a traffic control configuration register that can be configured with input traffic control parameters to control the input traffic, and output traffic control parameters to control the output traffic by the TC circuit 204. For example, the input traffic control parameters can be configured to block or unblock, or change the rate/shape of the input traffic on the ingress stream 210 to the processing logic circuitry 202. Similarly, the output traffic control parameters can be configured to block or unblock, or change the rate/shape of the output traffic on the egress stream 212. In some implementations, the rate or the shape of the traffic can be changed by changing the number of packets that are being transferred in a given time period.

The TC circuit 204 may use corresponding timers from the set of timers 214 to track the duration of different control signals (e.g., ready and valid signals) of the ingress stream 210 and the egress stream 212 of being high and/or low. In some examples, a duration of an aggregation of a control signal being high or low over a certain time period can be counted to identify traffic patterns that can be used to control the traffic. For example, the TC ingress interface 218 may include an ingress valid signal and an ingress ready signal for receiving the ingress stream 210, and the monitor interface 226 may include an egress valid signal and an egress ready signal used for outputting the egress stream 212. The ingress ready signal may be high or asserted when the processing logic circuitry 202 is ready to receive packets from the preceding pipeline stage, and low or de-asserted when the processing logic circuitry 202 is not ready to receive packets from the preceding pipeline stage. The ingress valid signal may be high or asserted when the processing logic circuitry 202 is receiving valid packets from the preceding pipeline stage. Similarly, the egress ready signal may be high or asserted by the subsequent IC processing stage to indicate to the processing logic circuitry 202 that it is ready to receive the packets. The egress valid signal may be high or asserted when the processing logic circuitry 202 is sending valid packets on the egress stream 212 to the subsequent pipeline stage.

In some implementations, the set of timers 214 may include an ingress valid high timer to count a duration of the ingress valid signal being high, an ingress valid low timer to count a duration of the ingress valid signal being low, an ingress ready high timer to count a duration of the ingress ready signal being high, an ingress ready low timer to count a duration of the ingress ready signal being low, and an ingress valid high ready low timer to count a duration of the ingress valid signal being high in combination with the ingress ready signal being low. The set of timers 214 may further include an egress valid high timer to count a duration of the egress valid signal being high, an egress valid low timer to count a duration of the egress valid signal being low, an egress ready high timer to count a duration of the egress ready signal being high, an egress ready low timer to count a duration of the egress ready signal being low, and an egress valid low ready high timer to count a duration of the egress valid signal being low in combination with the egress ready signal being high.

As an example, the ingress valid signal being high in combination with the ingress ready signal being low may indicate that the IC component 200 is back pressuring an upstream IC pipeline stage in the processing pipeline 102, since the IC component 200 is not ready to receive new packets from the preceding pipeline stage, e.g., due to overflow of the internal buffers. Similarly, the egress valid signal being low in combination with the egress ready signal being high may indicate that the IC component 200 or a preceding pipeline stage is stuck since the IC component 200 is not outputting egress packets even though the subsequent pipeline stage is ready to receive the packets from the IC component 200. Furthermore, a respective duration of time for the ingress ready, ingress valid, egress ready, and egress valid signals can be used to collect statistics for debugging purposes and/or to track the performance of the computing device 100.

In some implementations, the TC ingress interface 218 may also include an ingress start of packet (sop) signal, an ingress end of packet (eop) signal, and an ingress byte count (bcnt) signal, and the monitor interface 226 may also include an egress sop signal, an egress eop signal, and an egress bcnt signal. The ingress sop and the ingress eop signals, when high or asserted, may indicate a start of an ingress packet and an end of the ingress packet, respectively, on the ingress stream 210. The egress sop and the egress eop signals, when high or asserted, may indicate a start of an egress packet and an end of the egress packet, respectively, on the egress stream 212. The ingress bcnt signal may indicate a count of bytes in the ingress packet on the ingress stream 210, and the egress bcnt signal may indicate a count of bytes in the egress packet on the egress stream 212.

In some implementations, each timer in the set of timers 214 can be used to count a duration of an aggregation of a corresponding signal being high or low over a certain time period, which can be used by the TC circuit 204 to control the input traffic and/or the output traffic. For example, an aggregation of the ingress valid signal being high over a certain time period may indicate that the ingress valid signal is being asserted multiple times within a short time period by the preceding IC processing stage to send back-to-back packets, which may be used by the TC circuit 204 to control the input traffic to the processing logic circuitry 202 to create backpressure. Similarly, an aggregation of the egress ready signal being low over a certain time period may indicate that the egress ready signal is being de-asserted multiple times within a short time period by the subsequent IC processing stage, which may be used by the TC circuit 204 to decrease the rate of the output traffic on the egress stream 212.

The TC circuit 204 may use respective counters from the set of counters 216 to track the number of packets and/or data traffic that are inside the IC component 200 for processing, and the number of packets outputted from the IC component 200. For example, the set of counters 216 may include a whole packet counter to count a number of whole packets inside the IC component 200, a traffic counter that counts an amount of data traffic inside the IC component 200, and an egress packet counter to count a number of packets outputted from the IC component 200 on the egress stream 212. As an example, the TC circuit 204 may increment the whole packet counter when the ingress sop signal is asserted and decrement the whole packet counter when the egress eop signal is asserted. The traffic counter may count the amount of data traffic inside the IC component 200 by counting a number of bytes, bits, words, double words, or any suitable data unit. In some examples, the egress packet counter may indicate a count of total number of packets that have passed through the IC component 200.

In some implementations, the set of timers 214 may also include a live stream timer to count a duration of time spent by each packet to traverse between an ingress cycle and a monitor cycle, which can be used to determine whether the stream or transfer of packets through the IC component 200 is alive.

The set of operational metric configurations may include respective thresholds and masks for the counters and the timers to generate an interrupt. The TC logic circuitry 232 may be further operable to generate an interrupt signal 230 based on the set of operational metric configurations, and the ingress stream 210 and/or the egress stream 212. For example, the TC logic circuitry 232 may generate interrupt signal 230 upon expiration of a timer, or a counter exceeding a threshold value based on a corresponding threshold and mask value provided by the set of operational metric configurations. The interrupt controller 208 may receive interrupt 230 signal indicating a problem in the operation of the IC component 200, and notify a processor of the computing device 100 to handle and resolve the interrupt.

In some cases, the TC logic circuitry 232 may be operable to block the ingress stream 210 to allow the processing logic circuitry 202 to stop receiving new packets for processing. For example, the processing logic circuitry 202 may be unable to process additional packets based on an internal buffer of the processing logic circuitry 202 being full. In some cases, an upstream component of the processing pipeline 102 may be stuck, and, therefore, the subsequent IC component of the IC component 200 may not be receiving packets from the IC component 200. For example, the egress ready signal received from the subsequent IC component may have been stuck at low indicating that the subsequent IC component is not available to accept packets sent by the IC component 200. Thus, the internal buffers in the IC component may be storing the processed packets that need to be sent out on the egress stream 212, and may not have space to accept new packets for processing from the preceding IC component.

In this case, the TC logic circuitry 232 may block the ingress stream 210 to generate backpressure for the preceding pipeline stage of the computing device 100. For example, when the whole packet counter reaches a threshold value, it may indicate that the number of whole packets inside the IC component 200 have reached a maximum value or the internal buffer is full, and the processing logic circuitry 202 is not able to receive additional packets on the ingress stream 210. In some implementations, the TC circuit 204 may use the TC ingress interface 218 to de-assert the ingress ready signal indicating to the preceding pipeline stage to stop sending packets. When the internal buffer becomes available, for example, the subsequent IC component starts receiving egress packets from the IC component 200, the whole packet counter may start decrementing, which may indicate that the processing logic circuitry 202 is ready to receive the new packets. In this case, the TC circuit 204 may assert the ingress ready signal indicating to the preceding pipeline stage to start sending new packets.

In some examples, the TC circuit 204 may block or unblock the egress stream 212, or change the rate of the egress stream 212 to control the egress traffic. For example, in some cases, the TC circuit 204 may block the egress stream 212 to be outputted from the IC component 200 if one or more packets in the egress stream 212 are marked as erroneous due to an error detected by the processing logic circuitry 202, or one or more packets are marked to be dropped by the IC component 200 for another reason. In some examples, the TC circuit 204 may change the rate of the egress stream 212 by controlling the number of packets being sent out within a time duration based on the egress traffic control configuration. In some examples, the TC circuit 204 may create bursts of data packets to be sent out on the egress stream 212 by controlling the egress valid signal.

Thus, the ability to control the ingress and egress traffic, and generate the backpressure by the TC circuit 204 can help the processing pipeline 102 to get un-stuck, and the ability to generate interrupts on expiration of different timers can help with the debugging process. This is further described with reference to FIG. 3.

Figure 3:
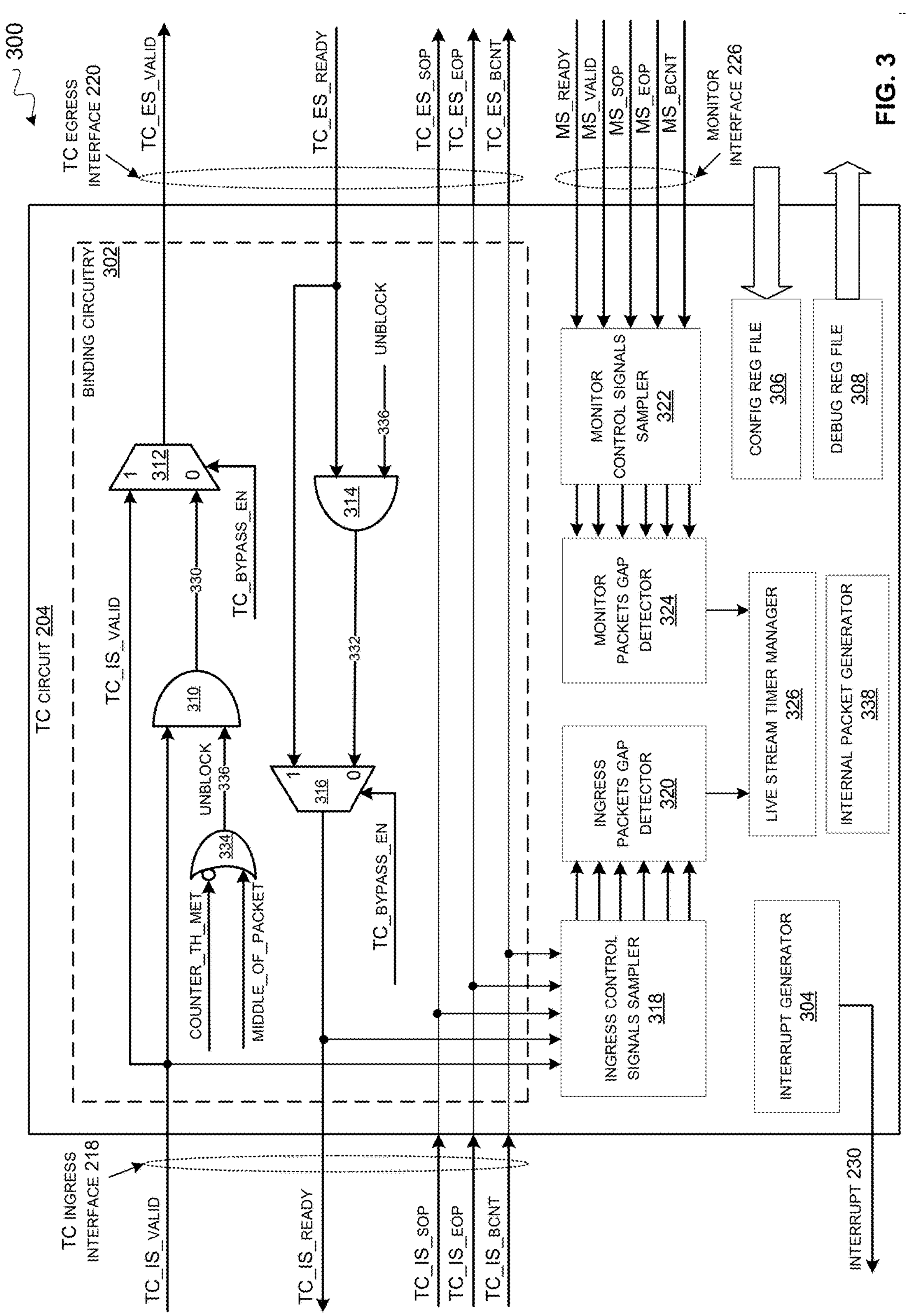
FIG. 3 illustrates an example block diagram of the TC circuit, in accordance with some embodiments.

FIG. 3 illustrates an example block diagram 300 of the TC circuit 204, in accordance with some embodiments.

The TC circuit 204 may include a config reg file 306 comprising registers to store various threshold and mask values for the set of timers 214 and the set of counters 216 of the TC circuit 204. For example, the config reg file 306 may be part of the reg file 206 in FIG. 2, and can be accessed using the configuration interface 228. In some implementations, a configuration register in the config reg file 306 can be programmed to assert a TC_bypass_en signal to bypass or disable the TC circuit 204. The config reg file 306 may also include a traffic control configuration register that can be configured with the input traffic control parameters and the output traffic control parameters to control the input traffic on the ingress stream 210 and the output traffic on the egress stream 212, respectively. The TC circuit 204 may also include a debug reg file 308 comprising the set of counters 216, the set of timers 214, and any other internal registers that can be read to help with the debugging process.

The example TC circuit 204 in FIG. 3 includes additional components that form the TC logic circuitry 232. For example, as shown in FIG. 3, the TC circuit 204 may include the TC ingress interface 218 for monitoring the ingress stream 210, the monitor interface 226 for monitoring the egress stream 212, and the TC egress interface 220 connected to the unit ingress interface 222 of the processing logic circuitry 202 for receiving the ingress stream 210. The TC ingress interface 218 may comprise a TC_IS_valid signal, a TC_IS_ready signal, a TC_IS_sop signal, a TC_IS_eop signal, and a TC_IS_bent signal. The TC egress interface 220 may comprise a TC_ES_valid signal, a TC_ES_ready signal, a TC_ES_sop signal, a TC_ES_eop signal, and a TC_ES_bent signal. The monitor interface 226 may comprise a monitor_valid signal, a monitor_ready signal, a monitor_sop signal, a monitor_eop signal, and a monitor_bent signal.

The TC circuit 204 may include binding circuitry 302 to block or pass the ingress steam 210 to the processing circuitry 202. As shown in FIG. 3, when the TC circuit 204 is bypassed, as indicated by the TC_bypass_en signal being asserted or 1, the TC egress interface 220 is the same as the TC ingress interface 218. For example, a multiplexer 312 may select the TC_IS_valid signal to be the TC_ES_valid signal, and a multiplexer 316 may select the TC_ES_ready signal to be the TC_IS_ready signal. The TC_ES_sop signal, TC_ES_eop signal, and the TC_ES_bent signal can be directly tied to the TC_IS_sop signal, TC_IS_eop signal, and the TC_IS_bent signal, respectively. Thus, in this case, the ingress stream 210 is passed to the processing logic circuitry 202.

When the TC circuit 204 is enabled (not bypassed), as indicated by the TC_bypass_en signal being de-asserted or 0, the TC_ES_valid signal and the TC_IS_ready signal may be controlled by a counter_th_met signal and a middle_of_packet signal. For example, the counter_th_met signal may be asserted when a counter has passed a threshold value, e.g., when the whole packet counter has passed a threshold value indicating that the internal buffers of the processing logic circuitry 202 are full. The middle_of_packet signal may be asserted when the ingress interface is in the middle of transferring a packet, and can be used to ensure that the transfer of the packet has completed before blocking the ingress stream based on the counter_th_met signal. In some examples, asserting the counter_th_met signal, when the middle_of_packet signal is 0, may create back pressure for the preceding processing pipeline stage by de-asserting or blocking the TC_IS_ready signal going to the preceding IC component, and the TC_ES_valid signal going to the processing logic circuitry 202 via the unit ingress interface 222. For example, asserting the counter_th_met signal and de-asserting the middle_of_packet signal may cause an OR gate 334 to de-assert an unblock signal 336, and, therefore, de-assert the TC_ES_valid signal by causing an output 330 of an AND gate 310 to be 0. Similarly, the unblock signal 336 may be used to de-assert the TC_IS_ready signal by causing an output 332 of an AND gate 314 to be 0.

In some implementations, the binding circuitry 302 may include similar logic to control the output traffic on the egress stream 212 being monitored by the TC circuit 204. For example, the binding circuitry 302 may include logic to block, unblock, or change the rate/shape of the output traffic on the egress stream 212 being outputted by the IC component 200 by de-asserting/asserting the MS_valid signal based on the set of operational metric configurations.

The TC circuit 204 may also include an ingress control signals sampler 318 to register the control signals of the TC ingress interface 218, and a monitor control signals sampler 322 to register the control signals of the monitor interface 226. For example, the ingress control signals sampler 318 may register the TC_IS_valid signal, TC_IS_ready signal, TC_IS_sop signal, TC_IS_eop signal, and the TC_IS_bent signal for sampling. The monitor control signals sampler 322 may register the monitor_valid signal, monitor_ready signal, monitor_sop signal, monitor_eop signal, and the monitor_bent signal for sampling.

An ingress packets gap detector 320 may be operable to detect a gap between the ingress packets based on the sampled TC_IS_valid, TC_IS_ready, TC_IS_sop, TC_IS_eop, and the TC_IS_bent signals. Since some of the counter and timers may track the number of cycles spent on handling an ingress packet, or in a gap between two ingress packets, the ingress packets gap detector 320 may be used to determine whether or not the cycles under consideration fall in the middle of an ingress packet, e.g., based on the ingress_sop and ingress_eop signals. For example, a count of cycles between the assertion of the ingress_sop signal and de-assertion of the ingress_eop signal may indicate the number of cycles spent on handling the packet. Similarly, a count of cycles between the assertion of two consecution ingress_sop signals may indicate a gap between two packets. The ingress packets gap detector 320 may also be operable to generate the middle_of_packet signal based on the ingress_sop and ingress_eop signals. For example, the middle_of_packet signal may be asserted at the assertion of the ingress_sop signal for a packet, and de-asserted at the de-assertion of the ingress_eop signal to indicate that the packet is in transit. The middle_of_packet signal may be used by the binding circuitry 302 to prevent blocking the ingress stream 310 in the middle of transferring the packet.

A monitor packets gap detector 324 may be operable to detect a gap between the egress packets based on the sampled monitor_valid, monitor_ready, monitor_sop, monitor_eop, and the monitor_bent signals. Since some of the counter and timers may track the number of cycles spent on handling an egress packet, or in a gap between two egress packets, the monitor packets gap detector 320 may be used to determine whether or not the cycles under considerations fall in the middle of an egress packet, e.g., based on the monitor_sop and monitor_eop signals, similar to the ingress packets gap detector 320.

The TC circuit 204 may also include a live stream timer manager 326 to manage which timers and/or counters have to be incremented based on the information provided by the ingress packets gap detector 320 and the monitor packets gap detector 324. For example, the ingress packets gap detector 320 may provide information whether a current cycle is the start, middle, or the end of an ingress packet, and the monitor packets gap detector 324 may provide information whether the current cycle is in the start, middle, or the end of an egress packet. The live stream timer manager 326 may use this information to identify the timers and/or counters to be incremented.

In some embodiments, the TC circuit 204 may include an internal packet generator 338 to generate a packet internally to support specific functionality, and inject the internally generated packet into the ingress stream 210 to the processing logic circuitry 202.

Figure 4:
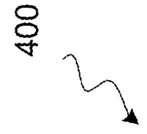
FIG. 4 illustrates an example of a flow chart for a method performed by the TC circuit, in accordance with some embodiments.
Figure 4:
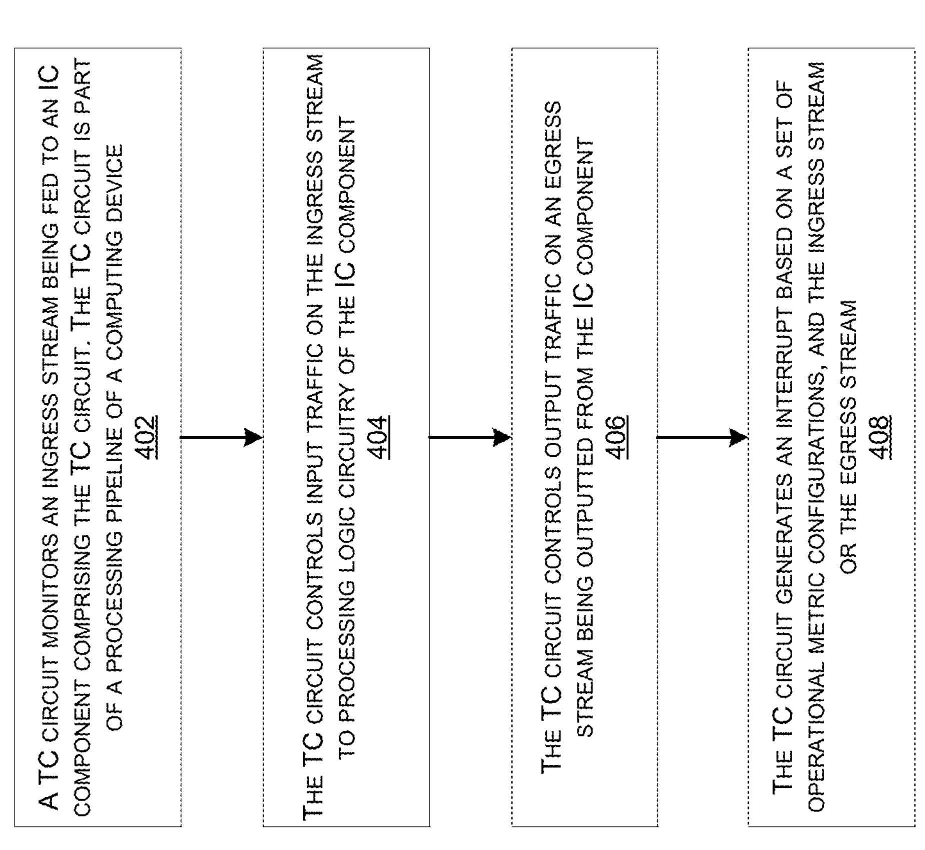

FIG. 4 illustrates an example of a flow chart 400 for a method performed by a TC circuit, in accordance with some embodiments. For example, the method may be performed by the TC circuit 204 (e.g., TC logic circuitry 232), or the TC circuits 106*a*-106*n*.

In step 402, the method includes monitoring an ingress stream being fed to an IC component comprising the TC circuit. The IC component is part of a processing pipeline of a computing device. Referring back to FIG. 2, the TC circuit 204 may monitor the ingress stream 210 being fed to the IC component 200 using the TC ingress interface 218. For example, the TC circuit 204 may monitor the ingress stream 210 using the TC_IS_valid signal, TC_IS_ready signal, TC_IS_sop signal, TC_IS_eop signal, and the TC_IS_bent signal described with reference to FIG. 3.

In step 404, the method includes controlling input traffic on the ingress stream to processing logic circuitry of the IC component. The TC circuit 204 may control the input traffic by blocking, unblocking, or changing the rate/shape of the input traffic on the ingress stream 210 based on the input traffic control parameters in the set of operational metric configurations. In some examples, the TC circuit 204 may control the input traffic by selecting between blocking the ingress stream 210 and passing through the ingress stream 210 to the processing logic circuitry 202. Referring back to FIG. 3, the TC circuit 204 may select between blocking the ingress stream 210 and providing the ingress stream 210 to the processing logic circuitry 202 using the multiplexers 312 and 314. For example, the TC circuit 204 may block the ingress stream 210 to the processing logic circuitry 202 via the AND gates 310 and 314 when the TC_bypass_en is de-asserted, and the processing logic circuitry 202 is unable to process additional packets based on an internal buffer of the processing logic circuitry 202 being full as indicated by the assertion of the counter_th_met signal when the middle_of_packet signal is de-asserted. The TC circuit 204 may unblock the ingress stream 212 for receiving by the processing logic circuitry 202 when the processing logic circuitry 202 is ready to process the additional packets in the ingress stream 210.

In step 406, the method includes controlling output traffic on an egress stream being outputted from the IC component. The TC circuit 204 may monitor the egress stream 212 being outputted from the IC component 200 using the monitor interface 226, and control the output traffic by blocking, unblocking, or changing the rate/shape of the output traffic on the egress stream 212 based on the output traffic control parameters in the set of operational metric configurations. For example, the TC circuit 204 may monitor and control the output traffic on the egress stream 212 using the monitor_valid signal, monitor_ready signal, monitor_sop signal, monitor_eop signal, and the monitor_bent signal described with reference to FIG. 3.

In step 408, the method includes generating an interrupt based on a set of operational metric configurations, and the ingress stream or the egress stream. The TC circuit 204 may generate the interrupt 230 based on the ingress stream 210 or the egress stream 212, and the set of operational metric configurations. For example, the TC circuit 204 may generate the interrupt 230 upon expiration of an unmasked egress valid low ready high timer from the set of timers 214 based on the configuration provided by the config reg file 306. For example, expiration of the egress valid low ready high timer may indicate that the IC component 200 or a preceding pipeline stage is stuck since the IC component 200 is not outputting egress packets (e.g., low egress valid signal) even though the subsequent pipeline stage is ready to receive the packets from the IC component 200 (e.g., high egress ready signal). The interrupt controller 208 of the processing logic circuitry 202 may receive the interrupt 230 from the TC circuit 202, and send the interrupt 230 to a processor of the computing device 100. Thus, the TC circuit 204 can be used to detect the problem in the processing pipeline 100, which can minimize the impact on the system performance.

Figure 5:
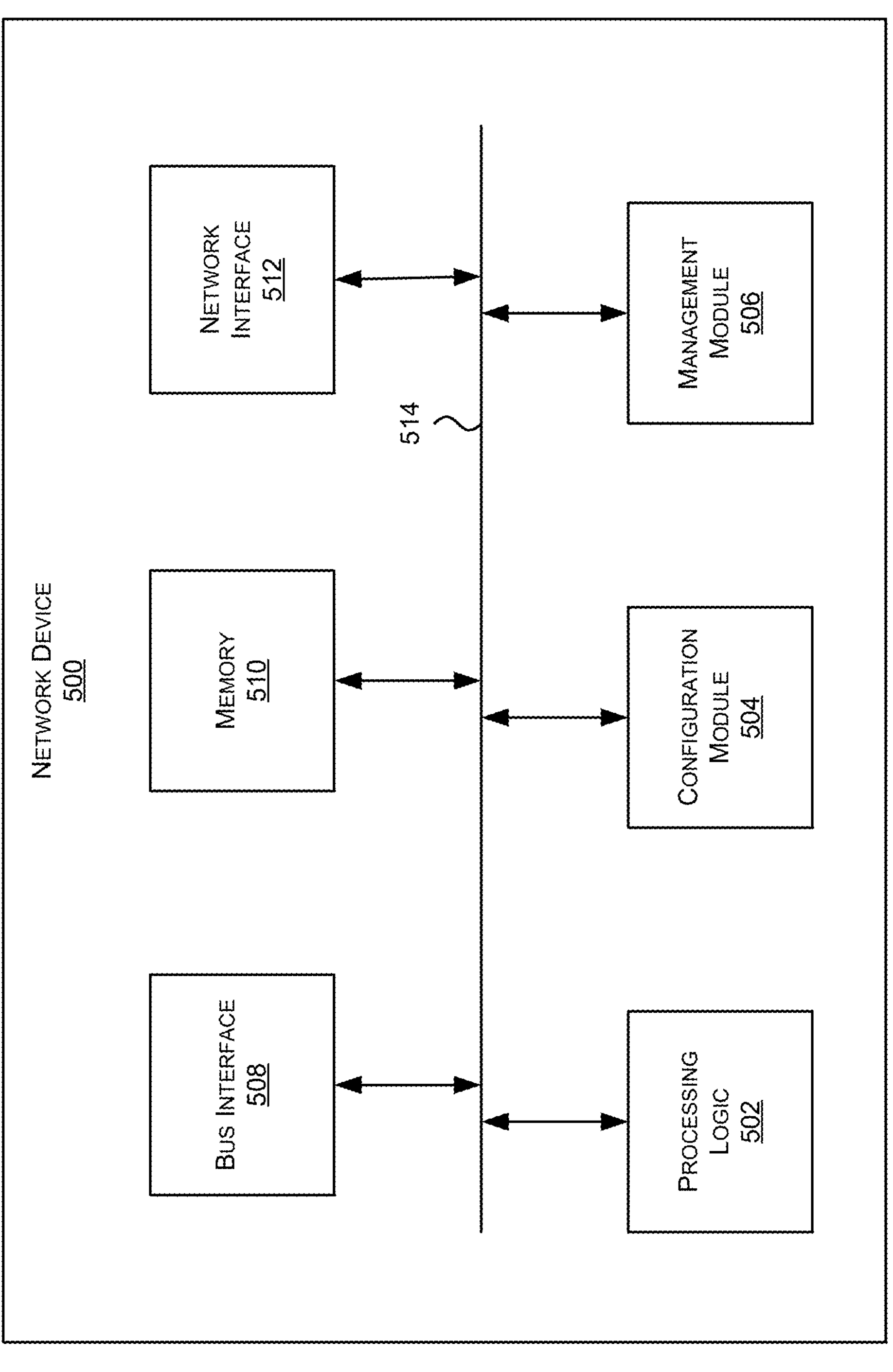
FIG. 5 illustrates an example of a network device, according to certain aspects of the disclosure.

FIG. 5 illustrates an example of a network device 500. Functionality and/or several components of the network device 500 may be used without limitation with other embodiments disclosed elsewhere in this disclosure, without limitations. For example, the network device 500 may be an example of the computing device 100, which can include zero, one, or more TC circuits 204 for each processing pipeline stage, as described with reference to the previous figures. A network device 500 may facilitate processing of packets and/or forwarding of packets from the network device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 500 may be the recipient and/or generator of packets. In some implementations, the network device 500 may modify the contents of the packet before forwarding the packet to another device. The network device 500 may be a peripheral device coupled to another computer device, a switch, a router or any other suitable device enabled for receiving and forwarding packets.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, which are not illustrated here. In some implementations, the network device 500 may include fewer modules. In some implementations, one or more of the modules may be combined into one module. One or more of the modules may be in computing with each other over a computing channel 514. The computing channel 514 may include one or more busses, meshes, matrices, fabrics, a combination of these computing channels, or some other suitable computing channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable computing with external entities, such as a host device and/or other components in a computing system, over an external computing medium. The bus interface module 508 may include a physical interface for connecting to a cable, socket, port, or other connection to the external computing medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless computing to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase “at least one of X, Y, or Z,” unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing device comprising:

a processing pipeline comprising a plurality of integrated circuit (IC) pipeline stages, wherein each IC pipeline stage comprises:

a traffic controller (TC) circuit comprising:

a traffic control configuration register;

a set of timers;

a set of counters; and

TC logic circuitry operable to:

monitor an ingress stream being fed to the IC pipeline stage for processing;

control input traffic on the ingress stream to processing logic circuitry of the IC pipeline stage based on input traffic control parameters in the traffic control configuration register;

monitor an egress stream being outputted from the IC pipeline stage by the processing logic circuitry;

control output traffic on the egress stream based on output traffic control parameters in the traffic control configuration register; and generate an interrupt based on a set of operational metric configurations, and the ingress stream or the egress stream; and the processing logic circuitry operable to:

process the ingress stream from the TC circuit to generate the egress stream for outputting from the IC pipeline stage.

2. The computing device of claim 1, wherein the set of operational metric configurations includes respective thresholds and masks for the counters and for the timers.

3. The computing device of claim 1, wherein controlling the input traffic includes selecting between blocking the ingress stream and passing through the ingress stream to the processing logic circuitry, and wherein the TC circuit is further operable to:

block the ingress stream based on a counter passing a threshold indicating that the processing logic circuitry is unable to receive new packets in the ingress stream due to an overflow of a buffer, and unblock the ingress stream when the processing logic circuitry is able to receive the new packets in the ingress stream upon the buffer becoming available.

4. The computing device of claim 1, wherein controlling the input traffic includes changing a rate or shape of the input traffic on the ingress stream based on the input traffic control parameters, and wherein controlling the output traffic includes changing a rate or shape of the output traffic on the egress stream based on the output traffic control parameters.

5. An integrated circuit (IC) component, comprising:
a traffic controller (TC) circuit operable to:
monitor an ingress stream being fed to the IC component for processing, wherein the IC component forms a processing pipeline stage of a computing device;
control input traffic on the ingress stream to processing logic circuitry of the IC component;
control output traffic on an egress stream being outputted from the IC component by the processing logic circuitry; and
generate an interrupt based on a set of operational metric configurations, and the ingress stream or the egress stream; and
the processing logic circuitry operable to:
process the ingress stream from the TC circuit to generate the egress stream for outputting from the IC component.

6. The IC component of claim 5, wherein controlling the input traffic includes selecting between blocking the ingress stream and passing through the ingress stream to the processing logic circuitry.

7. The IC component of claim 5, wherein controlling the input traffic includes changing a rate or a shape of the input traffic on the ingress stream based on input traffic control parameters in the set of operational metric configurations.

8. The IC component of claim 5, wherein controlling the output traffic includes changing a rate or a shape of the output traffic on the egress stream based on output traffic control parameters in the set of operational metric configurations.

9. The IC component of claim 5, wherein the TC circuit includes a set of counters, and the set of operational metric configurations includes respective thresholds and masks for the counters to generate the interrupt.

10. The IC component of claim 9, wherein the set of counters includes a whole packet counter that counts a number of whole packets inside the IC component, or a traffic counter that counts an amount of data traffic inside the IC component.

11. The IC component of claim 9, wherein the set of counters includes an egress packet counter that counts a number of packets outputted from the IC component.

12. The IC component of claim 5, wherein the TC circuit includes a set of timers, and the set of operational metric configurations includes respective thresholds and masks for the timers to generate the interrupt.

13. The IC component of claim 12, wherein the TC circuit includes an ingress interface having an ingress valid signal and an ingress ready signal for receiving the ingress stream, and wherein the set of timers includes:
an ingress valid high timer to count a duration of the ingress valid signal being high;
an ingress valid low timer to count a duration of the ingress valid signal being low;
an ingress ready high timer to count a duration of the ingress ready signal being high;
an ingress ready low timer to count a duration of the ingress ready signal being low; and
an ingress valid high ready low timer to count a duration of the ingress valid signal being high in combination with the ingress ready signal being low.

14. The IC component of claim 12, wherein the TC circuit includes a monitor interface having an egress valid signal and an egress ready signal used for monitoring the egress stream, and wherein the set of timers includes:
an egress valid high timer to count a duration of the egress valid signal being high;
an egress valid low timer to count a duration of the egress valid signal being low;
an egress ready high timer to count a duration of the egress ready signal being high;
an egress ready low timer to count a duration of the egress ready signal being low; and
an egress valid low ready high timer to count a duration of the egress valid signal being low in combination with the egress ready signal being high.

15. The IC component of claim 5, wherein the TC circuit includes an internal packet generator to inject an internally generated packet into the ingress stream to the processing logic circuitry.

16. The IC component of claim 6, wherein the TC circuit is configurable to block the ingress stream to generate backpressure for a preceding pipeline stage of the computing device.

17. The IC component of claim 5, wherein the processing logic circuitry includes an interrupt controller to receive the interrupt from the TC circuit, and send the interrupt to a processor of the computing device.

18. A method performed by a traffic controller (TC) circuit, comprising:
monitoring an ingress stream being fed to an integrated circuit (IC) component 2 comprising the TC circuit, wherein the IC component is part of a processing pipeline of a computing device;
controlling input traffic on the ingress stream to processing logic circuitry of the IC component;
controlling output traffic on an egress stream being outputted from the IC component; and
generating an interrupt based on a set of operational metric configurations, and the ingress stream or the egress stream.

19. The method of claim 18, wherein controlling the input traffic includes selecting between blocking the ingress stream and passing through the ingress stream to the processing logic circuitry.

20. The method of claim 18, wherein controlling the input traffic includes changing a rate or a shape of the input traffic on the ingress stream based on input traffic control parameters in the set of operational metric configurations.

21. The method of claim 18, wherein controlling the output traffic includes changing a rate or a shape of the output traffic on the egress stream based on output traffic control parameters in the set of operational metric configurations.

* * * * *